United States Patent

Knuppel

[11] Patent Number: 5,918,410
[45] Date of Patent: Jul. 6, 1999

[54] SEALABLE BAITING DEVICE

[75] Inventor: Harry E. Knuppel, Albia, Iowa

[73] Assignee: Kness Manufacturing Co., Inc., Albia, Iowa

[21] Appl. No.: 09/088,206

[22] Filed: Jun. 1, 1998

[51] Int. Cl.⁶ ................................................ A01M 1/20
[52] U.S. Cl. ............................................. 43/131; 43/132.1
[58] Field of Search ........................ 43/124, 131, 132.1; 47/48.5, 79

[56] References Cited

U.S. PATENT DOCUMENTS

| | | | |
|---|---|---|---|
| 1,815,595 | 7/1931 | Simpson | 43/131 |
| 4,211,028 | 7/1980 | Roberling | 43/131 |
| 4,261,132 | 4/1981 | Carothers et al. | 43/131 |
| 4,570,377 | 2/1986 | Primavera | 43/131 |
| 4,658,536 | 4/1987 | Baker | 43/131 |
| 4,717,051 | 1/1988 | Leclerc | 222/545 |
| 4,730,412 | 3/1988 | Sherman | 43/131 |
| 4,741,448 | 5/1988 | Alley et al. | 215/266 |
| 4,831,775 | 5/1989 | Sherman | 43/131 |
| 5,259,534 | 11/1993 | Lynd | 222/81 |
| 5,325,626 | 7/1994 | Jackson | 43/124 |
| 5,340,030 | 8/1994 | Siegrist, Jr. | 239/289 |
| 5,390,441 | 2/1995 | Pence | 43/131 |
| 5,397,033 | 3/1995 | Blomquist | 43/131 |
| 5,528,854 | 6/1996 | Antonali et al. | 43/131 |
| 5,636,470 | 6/1997 | Blomquist | 43/131 |
| 5,746,021 | 5/1998 | Green | 43/131 |
| 5,857,286 | 1/1999 | Doucette | 43/131 |

Primary Examiner—Michael J. Carone
Assistant Examiner—Darren W. Ark
Attorney, Agent, or Firm—Zarley, McKee, Thomte, Voorhees & Sease

[57] ABSTRACT

A baiting device for treating insects includes a stem having a hollow upper end with a first opening therein and a second opening therein longitudinally spaced downward from the first opening. A bait container mounts on the stem and surrounds the first opening without covering the second opening. A lid detachably secures to the container so as to seal the interior of the container from direct communication with an outside environment except through the first opening and the second opening and the hollow upper end of the stem. A valve member slidably mounts on the stem and slidably moves by gravity from a first position unobstructing the first opening to a second position obstructing the first opening so as to prevent spillage of bait from the container when the container is tipped upside down.

19 Claims, 3 Drawing Sheets

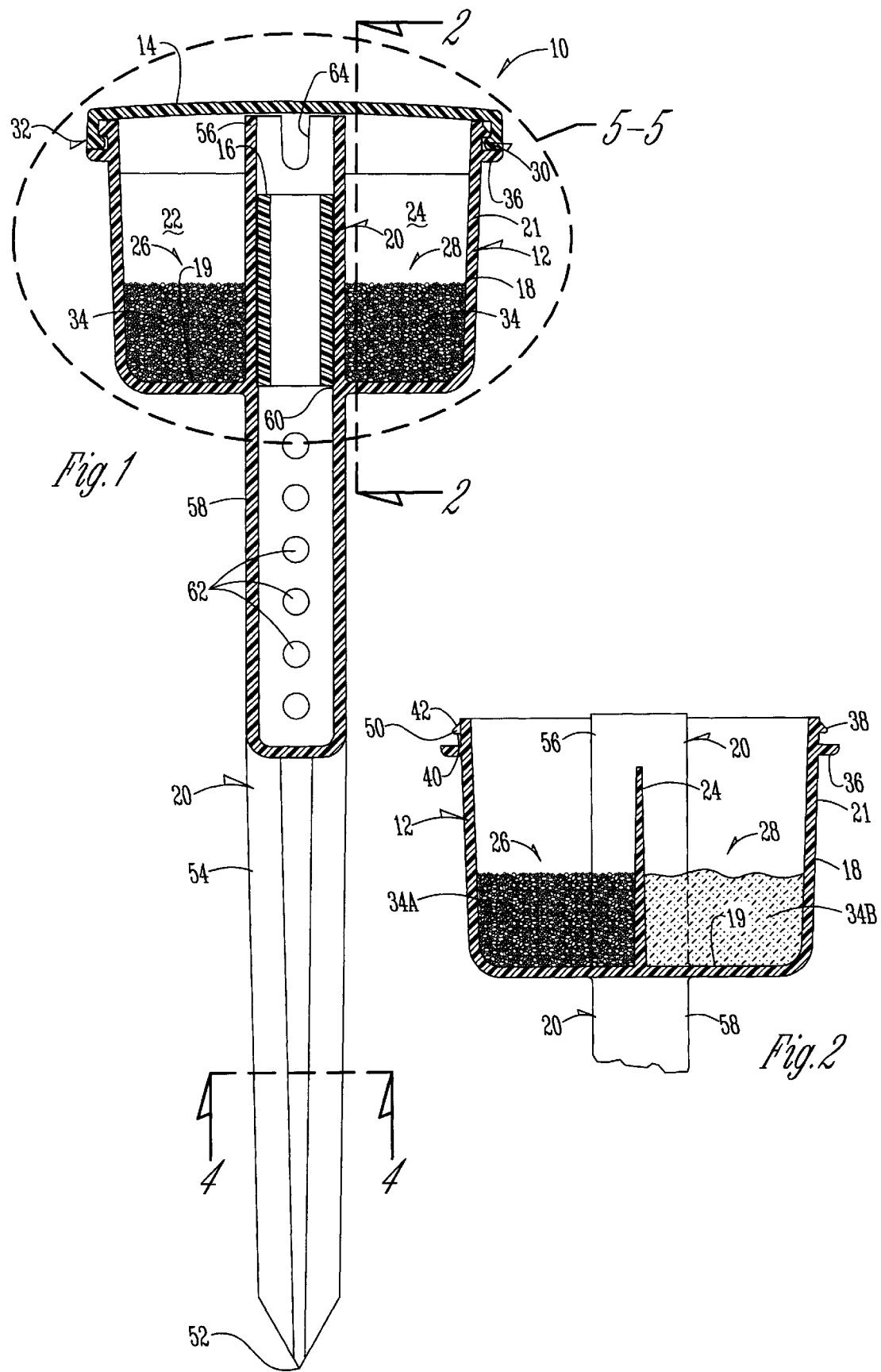

SEALABLE BAITING DEVICE

BACKGROUND OF THE INVENTION

The present invention relates to a baiting device for insects. More particularly, this invention relates to a sealable baiting device for crawling insects. The device protects the bait from the elements and prevents spillage of the potentially harmful bait when the device is tipped over by children or pets.

In the battle against crawling insects, one of the most popular and effective weapons is the use of bait which is taken by the insects back to the insects' home where more complete exposure or exposure to key insects (i.e., a queen) can occur. Baits are commonly spread around, near, or on the surface of the home of the insects or near where the insects gather food. Exposure to outside elements, however, can reduce the life and/or effectiveness of bait as it is washed away, diluted, dissolved, blown away, etc. Further, children, household pets, and livestock may also get into the bait, creating potential risks for themselves, as well as exposing the bait to the elements.

Various devices have been utilized in the battle against insects. One device has a sealable container and a hollow stake attached thereto for insertion into the ground. A hole extends through the hollow stake and provides fluid communication between the interior of the stake and the container which holds the bait. Preferably the bait is a material in gel or granule form which is harmful or even poisonous to the insects.

The hole through the stake is located above the level of the bait within the container. A plurality of access holes are provided in the stake below the container, yet above ground level. These access openings allow the ants or other crawling insects to enter the interior of the tubular stake and crawl into the container above through the upper hole in the stake. The insects typically exit the container in the same manner as they entered. According to their usual food gathering habits, the insects take some of the poisonous bait with them to their homes. The bait is shared with other insects at the home base, hopefully the queen, and a great number of the insects can be killed without exposing the bait to domesticated animals or children who might be in the area.

Spillage of the bait is one potential problem with the type of devices described above. The bait might spill or leak out of the device through the openings provided for the insects. This might occur when the device is pulled from the ground and turned sideways or upside down. Therefore, there is a need for an improved sealable baiting device which minimizes leaks and spills.

A primary objective of the present invention is the provision of a baiting device which minimizes the risk of bait spilling therefrom or becoming accessible to domesticated animals or children.

Another objective of the present invention is the provision of a sealable baiting device which has a strong, durable, and highly integrated construction.

Another objective of the present invention is the provision of a sealable baiting device which has an integral container assembly (stake and container) that can be formed by conventional plastic molding techniques.

Another objective of the present invention is the provision of a baiting device sturdy enough to be hammered into hard or rocky soil.

Another objective of the present invention is the provision of a sealable baiting device having a child proof lid lockingly attached to the container without the use of separate fasteners.

Another objective of the present invention is the provision of a baiting device having a valve member therein for blocking the fluid passageway between the bait and the exterior environment when the container is tipped upside down.

Another objective of the present invention is the provision of a baiting device having a stake with a hollow upper end and a solid lower end.

Another objective of the present invention is the provision of a sealable baiting device with a valve member slidably disposed inside a hollow upper end of the stem.

Another objective of the present invention is the provision of an improved sealable baiting device.

Another objective of the present invention is the provision of a baiting device that is easy and inexpensive to manufacture, durable and reliable in use, and safe and easy to use.

These and other objectives will be apparent from the drawings, as well as from the description and claims which follow.

SUMMARY OF THE INVENTION

The present invention relates to a device for baiting insects. The baiting device of this invention includes a stem having a hollow upper end with a first opening therein and a second opening therein spaced downward from the first opening. A bait container mounts on the stem and surrounds the first opening without covering the second opening. A lid detachably and sealingly covers the open top of the container, thus sealing the interior of the container from direct communication with an outside environment except through the first opening and the second opening and the hollow upper end of the stem. A valve member slidably mounts on the stem and moves by gravity from a first position unobstructing the first opening to a second (sealing) position obstructing the first opening so as to prevent spillage of bait from the container when the container is tipped upside down.

BRIEF DESCRIPTION OF THE DRAWINGS

FIG. 1 is a partially sectioned front elevation view of the baiting device of this invention.

FIG. 2 is an enlarged sectional view taken along line 2—2 in FIG. 1 to show further detail concerning the container and the lid of this invention.

DETAILED DESCRIPTION OF THE PREFERRED EMBODIMENT

Figure 3:
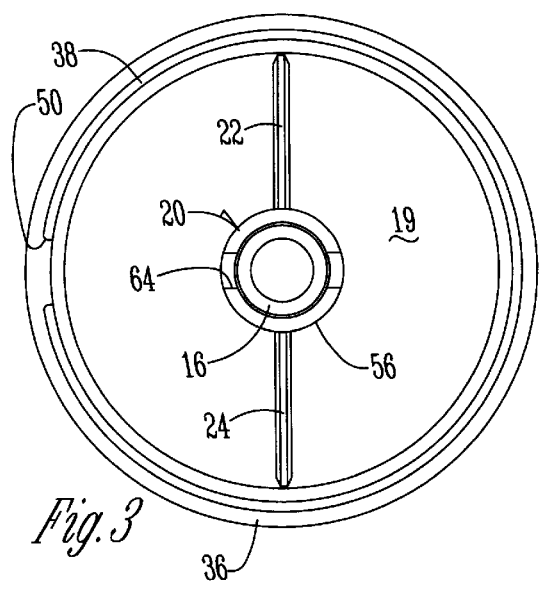
FIG. 3 is a view of the top of the device of this invention with the lid removed.

In the drawings, the baiting device of this invention is designated by the reference numeral 10. Referring to FIG. 1, the device 10 includes the following major components: a container assembly 12, a lid 14 and a valve member 16.

The container assembly 12 includes a container 18 concentrically surrounding an elongated stake 20 or stem. In the preferred embodiment, the container 18 and the stake 20 are made of a strong, durable plastic material and are molded together so as to form a single integrated unit. However, it is contemplated that the container 18 and the stake 20 can be separate pieces which are sealingly joined together. For example, the container 18 can have a central opening with pipe threads thereon which are sealingly joined to mating pipe threads on the outer diameter of the stake 20. The separate container and stem could also be heat sealed together. Advantageously, the preferred embodiment offers a strong and rigid unitary container assembly 12 which can be pressed into the ground by hand or hammered into the ground if necessary.

As best seen in FIGS. 1–3, the container assembly 12 includes a plurality of divider walls 22, 24 which extend between the stake 20, an interior side wall 26 and a bottom wall 19 of the container 18. The dividers 22, 24 are sealingly joined to the container 18 and the stake 20. The divider walls 22, 24 extend upwardly from the bottom 30 of the container 18, but preferably do not reach the lid 14. As best seen in FIG. 2, the dividers 22, 24 are tapered from bottom to top, thereby providing draft for molding purposes. The dividers 22, 24 separate the interior of the container into separate and distinct bait compartments 26, 28.

The container 18 has a peripheral flange 30 thereon which sealingly interlocks with a mating peripheral flange 32 on the lid 14. The container flange 30 and the lid flange 14 form an interlocking "child-resistant" or "child-proof" structure which reduces the risk of children or pets being able to remove the lid 14 from the container 18.

The child-resistant structure preferably includes the following features on the container. First, a bottom lip or rim 36 extends radially outward in a horizontal direction from the container 18. Vertically spaced above the bottom lip 36 is a triangular or wedge-shaped retaining flange 38. The retaining flange 38 has a generally horizontal base 40 and an angled portion 42 which tapers downwardly and outwardly from the container to meet the protruding tip of the base.

The lid 14 includes a mating peripheral flange 32, that is an inwardly dog-legged peripheral flange or holddown tab. The flange 32 includes a downwardly protruding portion 46 and an inwardly protruding portion 48. The downwardly protruding portion 46 is adapted to bring the inwardly protruding portion 48 into alignment with the space between the bottom lip 36 and the retaining flange 38. The inwardly protruding portion 48 fits snugly between the bottom lip 36 and the retaining flange 38, but is still capable of sliding action between the lip 36 and the retaining flange 38. The inwardly protruding portion 48 can comprise a plurality of protrusions spaced around the circumference of the lid 14. Because of the angled portion 42 of the retaining flange 38, the lid 14 can be pushed onto the container 18 until the dog-legged flange 32 snaps into place between the retaining flange 38 and the bottom lip 36. When the lid 14 is rotated with respect to the container 18, the inwardly protruding portion(s) 48 eventually registers with a gap 50 in the retaining flange 38. (See FIGS. 2 and 3.) Then, a person with sufficient strength, dexterity and intelligence can push the lid 14 off of the container 18 with their thumb.

The above-described interlocking structure is commonly used on containers for medication or over-the-counter drugs, but is believed to be novel with respect to insect baiting devices. Other known child resistant lid structures can be utilized without detracting from the invention.

Figure 4:
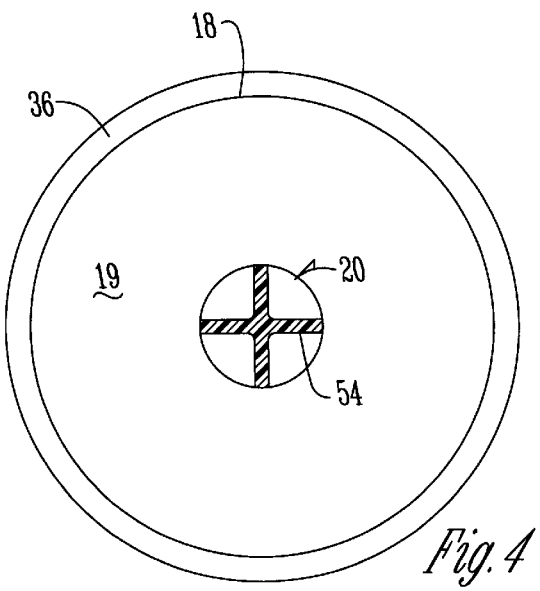
FIG. 4 is a horizontal cross-sectional view of the stake taken along line 4—4 in FIG. 1.
Figure 5:
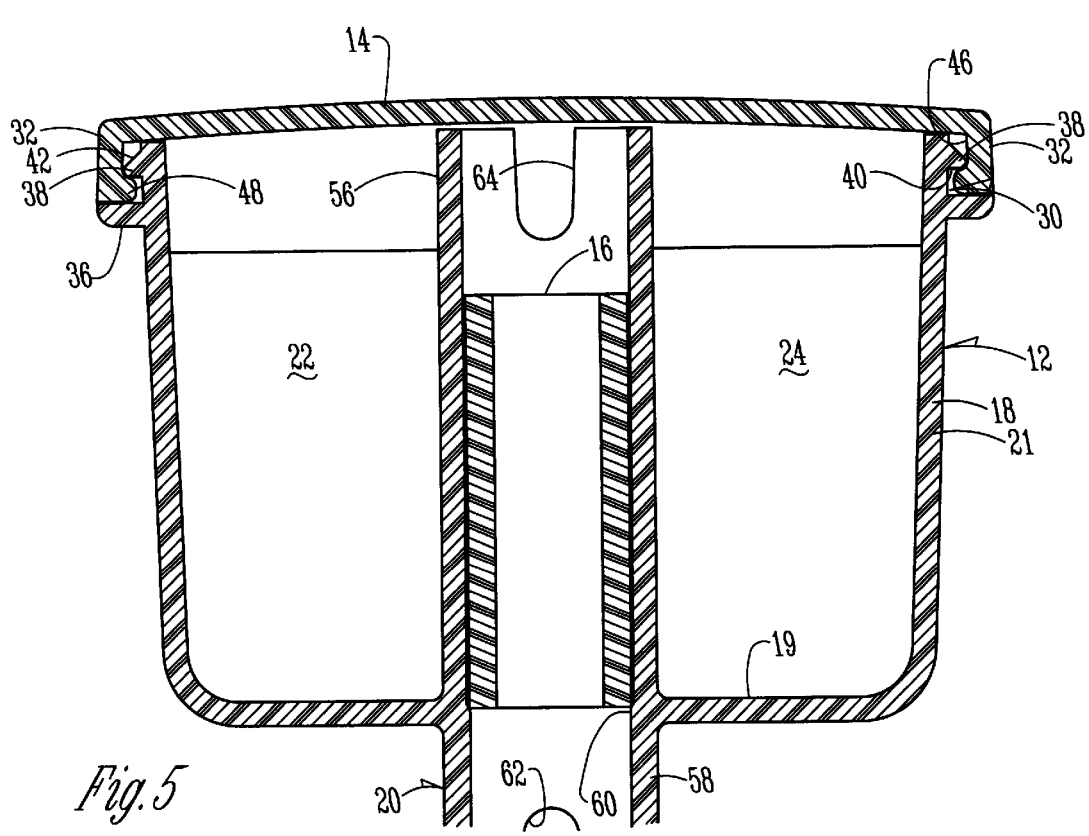
FIG. 5 is an enlarged view of the area 5—5 in FIG. 1 and shows the lid and the integrated stake and container assembly, as well as the valve therein.
Figure 6:
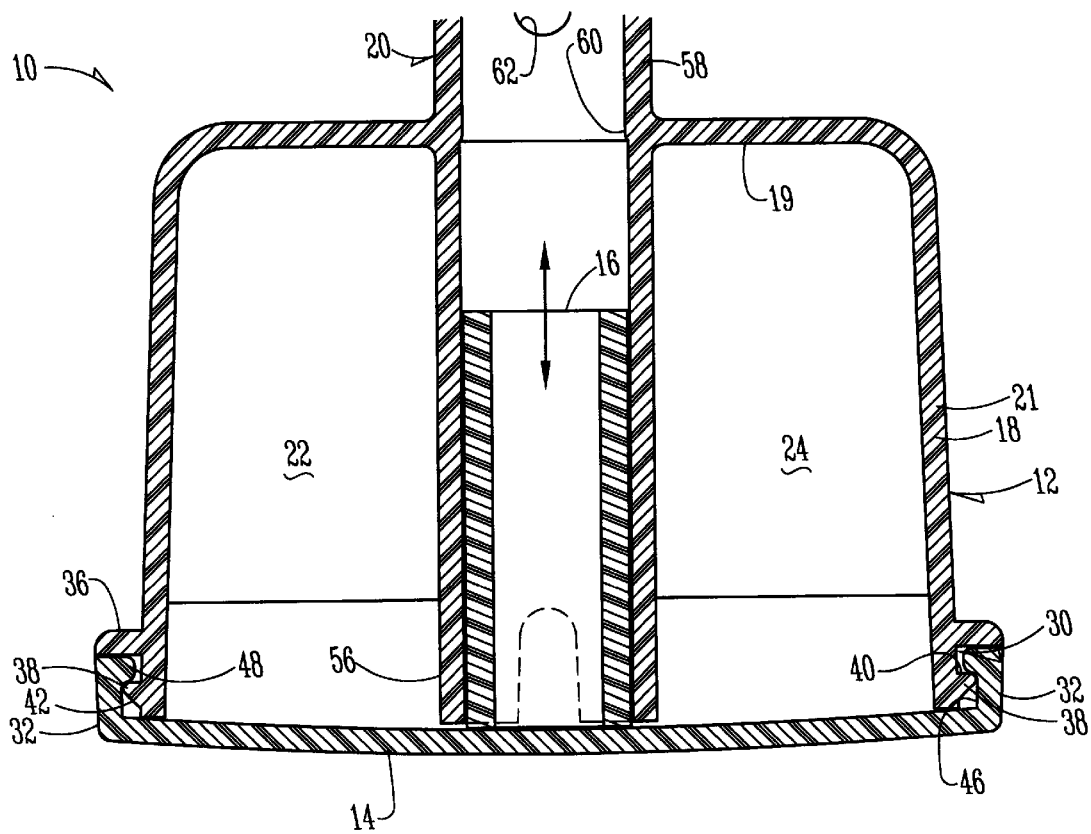
FIG. 6 is a sectional view similar to FIG. 5, except that the container has been turned upside down so as to move the valve member into a sealing position.

Referring to FIGS. 1 and 4–6, the stake or stem 20 has a point 52 at the end remote from the container 18. This facilitates inserting the device 10 into the ground or soil. The stake 20 has a lower end 54, an upper end 56, and an intermediate portion 58. The lower end 54 of the stake 20 is tapered to the point 52 and has a generally cross-shaped horizontal cross-section, as best seen in FIG. 4.

Referring again to FIG. 1, the lower end 54 of the stake 20 is solid, while the intermediate portion 58 and upper end 56 of the stake are hollow because a cavity is formed therein. The intermediate portion 58 includes a plurality of spaced apart insect access holes 62 therein. The holes 62 are preferably spaced apart vertically along the intermediate portion 58 of the stake 20. In the preferred embodiment, it is intended that the stake 20 be inserted into the ground so that the holes 62 are exposed above ground level. Thus, insects attracted by the aroma of the bait 34 can crawl up the outside of the stake 20 and enter the access holes 62.

Moving to the upper end 56 of the stake 20, a rib or shoulder 60 protrudes into the hollow portion of the stake 20 above the highest of the access holes 62. In the preferred embodiment shown, the shoulder 60 is generally aligned with the bottom of the container 18. The shoulder 60 could also be a rib for material savings, but such a configuration would probably have to be machined rather than molded.

The upper end 56 of the stake 20 has at least one opening near its upper end. Preferably a plurality of grooves 64 in the end of the stake 20 define the opening. Two generally opposing grooves 64 positioned approximately 180 degrees apart have been found to perform well. Similar to the holes 62, the grooves 64 are large enough to permit the access of insects, including but not limited to crawling insects such as ants, fire ants, and the like. FIGS. 1 and 2 show that the upper end 56 of the stake 20 extends slightly above the open top of the container 18 so that the stake 20 is closely adjacent to the slightly dome-shaped lid 14.

The valve member 16 comprises a generally cylindrical sleeve slidably mounted either inside or outside of the hollow upper end 56 of the stake 20. Preferably, the valve member 16 is slidably mounted with limited clearance to prevent the passage of insects and bait therearound. In the preferred embodiment, the valve member 16 is also fully disposed within the container 18. The shoulder 60 limits the lower position of the valve member such that the valve member 16 does not obstruct the access holes 62 or the grooves 64 when the container 18 is in an upright position.

Because of the unique structure of this device, a plurality of different baits can be utilized in a single container to entice the insects. For instance, as shown in FIG. 2, bait in the form of granules 34A can be placed in one compartment 26 of the container 18 and bait in the form of a gel 34B can be placed in the other compartment 28. Different baits may be attractive to different insects or even to the same insects at different times of the day or year.

In operation, the user places the device 10 near the insects' home or in an area where the insects have been observed gathering food. The point 52 of the stake 20 is positioned in the desired location and the user presses on the lid 14 of the container 18 above the stake 20 to force it into the ground. If the soil or ground is especially hard or rocky, a hammer can be utilized thanks to the strength and rigidity of the integrated container and stake structure provided by the device 10. At least some, and preferably all, of the access holes 62 should be visible when the device 10 is installed to the proper depth.

The user places the appropriate bait or baits in the container 18. Insects enter the access holes 62, making their way up the hollow portion of the stake 20 until they reach the grooves 64 and enter the bait compartments 26, 28. The insects partake of the bait 34 in the container 18. Furthermore, the insects typically retrace their path through the grooves 64, through the sleeve or valve member 16, and access holes 62, carrying the bait with them to their domicile, where they share it with other insects.

If pets or children are playing near the device 10 and are for some reason attracted to it, it is difficult for them to extract bait from the device. Of course, in an upright to near horizontal position, the bait will not spill from the container. The child-proof lid 14 prevents the young and the curious from removing the lid 14 to gain access to the bait 34. However, the young and the curious are not so easily deterred. A child or pet may knock the stake 20 from the ground and turn the container 18 upside down in an effort to reach the bait. When this happens, the valve member 16 slides by gravity from a first position shown in FIG. 5 to a second position shown in FIG. 6. In the second position, the valve member covers, blocks or otherwise obstructs the grooves 64 at the upper end 56 of the stake 20. The valve member 16 also rests or abuts against the underside of the lid 14 to prevent bait from escaping between the lid 14 and the valve member 16. When the container 18 returns to an upright position, the valve member 16 will automatically fall into the position shown in FIG. 5. Thus, the bait 34 cannot easily escape from the container 18. This is a significant improvement over conventional and commonly available devices.

In the drawings and specification there has been set forth a preferred embodiment of the invention, and although specific terms are employed, these are used in the generic and descriptive sense only and not for purposes of limitation. Changes in the form and the proportion of parts as well as in the substitution of equivalents are contemplated as circumstances may suggest or render expedient without departing from the spirit or scope of the invention as further defined in the following claims.

What is claimed is:

1. A baiting device for treating insects, comprising:
    a stake having an upper end with a cavity therein and a lower end for insertion into a support surface;
    a sealable container for holding bait thereinside, the container being mounted on the stake such that the cavity at least partially extends inside the container;
    the stake having a fluid passageway extending from the exterior of the container above the support surface to the interior of the container through the cavity; and
    a valve member slidably mounted on the stake so as to slide by gravity to seal off the fluid passageway when the container tips over beyond a horizontal plane.

2. The device of claim 1 wherein the sealable container further comprises an open top and a lid child-resistantly lockingly attached to the container in sealing and covering relation to the top.

3. A baiting device for treating crawling insects, comprising:
    a stem having a hollow upper end extending above ground level, the hollow upper end having a first opening therein and a second opening therein spaced downwardly from the first opening;
    a bait container mounted on the stem and surrounding the first opening without covering the second opening, thereby allowing insects to enter the container through the first and second openings;
    a lid detachably securable to the container so as to seal the interior of the container from direct communication with an outside atmosphere except through the first and second openings and the hollow upper end of the stem; and
    a valve member slidably mounted on the stem and slidable by gravity from a first position unobstructing said first opening to a second position fully obstructing said first opening so as to prevent spillage of bait from the container when the container is tipped upside down.

4. The device of claim 3 wherein the valve member is a hollow sleeve.

5. The device of claim 3 wherein the valve member is slidably disposed inside the hollow upper end of the stem.

6. The device of claim 5 wherein a shoulder on the stem protrudes inside the hollow upper end.

7. The device of claim 6 wherein the shoulder extends annularly inside the hollow upper end.

8. The device of claim 3 wherein the shoulder is within the container and the valve member is disposed within the container.

9. The device of claim 3 wherein the stem has a solid lower end disposed below the second opening and adapted for insertion below ground level.

10. The device of claim 9 wherein the lower end has a cross-shaped horizontal cross section.

11. The device of claim 3 wherein the valve member is generally cylindrical.

12. The device of claim 3 wherein the stem and container are molded together so as to constitute a single integrated piece.

13. The device of claim 3 wherein the first opening comprises a groove at the upper end of the stem.

14. The device of claim 3 wherein the first opening is a plurality of generally opposing grooves.

15. The device of claim 3 wherein the container has a bottom and a side wall extending upwardly from the bottom and around the stem, a plurality of generally upright divider walls extending upwardly between the stem, the side wall, and the bottom so as to form a plurality of separate and distinct bait compartments within the container.

16. The device of claim 3 wherein the container has a peripheral flange and the lid has a mating peripheral flange which sealingly child-resistantly interlocks with the peripheral flange of the container to lock the lid on the container.

17. The device of claim 16 wherein the peripheral flange of the container has a gap therein for receiving a holddown tab on the lid so as to permit removal of the lid from the container.

18. The device of claim 3 wherein the lid is airtight.

19. The device of claim 3 wherein the valve member abuts the lid in the second position.

* * * * *